(12) United States Patent
Krishnamoorthy et al.

(10) Patent No.: US 10,938,010 B2
(45) Date of Patent: *Mar. 2, 2021

(54) ABSORBENT GLASS MAT SEPARATORS, VRLA BATTERIES, AND RELATED METHODS OF MANUFACTURE AND USE

(71) Applicant: Daramic, LLC, Charlotte, NC (US)

(72) Inventors: Ahila Krishnamoorthy, Bangalore (IN); Daniel R. Alexander, Matthews, NC (US)

(73) Assignee: Daramic, LLC, Charlotte, NC (US)

( * ) Notice: Subject to any disclaimer, the term of this patent is extended or adjusted under 35 U.S.C. 154(b) by 197 days.

This patent is subject to a terminal disclaimer.

(21) Appl. No.: 16/041,920

(22) Filed: Jul. 23, 2018

(65) Prior Publication Data
US 2018/0366706 A1 Dec. 20, 2018

Related U.S. Application Data

(62) Division of application No. 15/191,627, filed on Jun. 24, 2016, now Pat. No. 10,056,592.

(60) Provisional application No. 62/185,083, filed on Jun. 26, 2015.

(51) Int. Cl.
*H01M 2/16* (2006.01)
*H01M 2/14* (2006.01)
*H01M 2/18* (2006.01)
*H01M 10/12* (2006.01)
*H01M 10/08* (2006.01)

(52) U.S. Cl.
CPC ......... *H01M 2/1613* (2013.01); *H01M 2/145* (2013.01); *H01M 2/16* (2013.01); *H01M 2/18* (2013.01); *H01M 10/08* (2013.01); *H01M 10/121* (2013.01)

(58) Field of Classification Search
CPC .... H01M 10/08; H01M 10/121; H01M 2/145; H01M 2/16; H01M 2/1613; H01M 2/18
See application file for complete search history.

(56) References Cited

U.S. PATENT DOCUMENTS

| | | |
|---|---|---|
| 4,465,748 A | 8/1984 | Harris |
| 6,194,100 B1 | 2/2001 | Vutetakis et al. |
| 6,689,509 B2 | 2/2004 | Zucker |
| 6,703,161 B2 | 3/2004 | Zucker |
| 6,852,444 B2 | 2/2005 | Zucker |
| 6,869,726 B2 | 3/2005 | Zucker |
| 7,682,738 B2 | 3/2010 | Ferreira et al. |
| 2003/0175593 A1 | 9/2003 | Chen et al. |
| 2005/0130031 A1 | 6/2005 | Zguris |
| 2011/0287324 A1 | 11/2011 | Rajaram et al. |

(Continued)

FOREIGN PATENT DOCUMENTS

| | | |
|---|---|---|
| JP | 02049353 A | 2/1990 |
| JP | 03152860 A | 6/1991 |
| JP | 09007574 A | 1/1997 |

*Primary Examiner* — Carlos Barcena
(74) *Attorney, Agent, or Firm* — Hammer & Associates, P.C.

(57) ABSTRACT

Disclosed herein are soluble content absorbent glass mats or AGM separators for VRLA, AGM, or VRLA AGM batteries. Such glass mats may be prepared from insoluble glass fibers blended with soluble content materials. Upon exposure to a suitable solvent, the dissolving or solvating of the soluble content produces voids within the glass mat. The voids enhance the absorption of the solvent within the glass mat. The soluble content may be acid-soluble glass fibers or microfibers.

22 Claims, 5 Drawing Sheets

(56) References Cited

U.S. PATENT DOCUMENTS

2012/0021295 A1    1/2012   Zguris et al.
2015/0099155 A1    4/2015   Guo et al.

ABSORBENT GLASS MAT SEPARATORS, VRLA BATTERIES, AND RELATED METHODS OF MANUFACTURE AND USE

RELATED APPLICATIONS

This application is a divisional application of U.S. patent application Ser. No. 15/191,627 filed Jun. 24, 2016, now U.S. patent Ser. No. 10,056,592, which claims priority to and benefit of U.S. Provisional Patent Application No. 62/185,083, filed on Jun. 26, 2015, the entire contents of both applications are herein fully incorporated by reference.

FIELD

In accordance with at least selected embodiments, at least the disclosure relates to novel or improved absorbent glass mats, separators, batteries, and/or methods of manufacture, use, acid filing, or combinations thereof. In accordance with at least certain embodiments, the disclosure relates to novel or improved absorbent glass mat (AGM) soluble content separators with enhanced porosity and/or wettability, AGM separators, valve regulated lead acid (VRLA) AGM batteries, and/or related methods of manufacture, use, acid filing, or combinations thereof. In accordance with at least other embodiments, the disclosure relates to novel or improved soluble content absorbent glass mats and/or absorbent glass mat (AGM) separators combined with novel or improved soluble content pasting papers and/or novel or improved soluble content polyethylene (PE) separators. In accordance with at least certain selected embodiments, the soluble content may be fibers, layers, flakes, particles, and the like.

BACKGROUND

Battery separators serve as electronic insulators and ionic conductors, i.e., they prevent the direct electronic contact of electrodes of opposite polarity while enabling the flow of ionic current between them. To meet these two functions, separators are usually porous insulators with pores as small as possible to prevent electronic short circuits by dendrites or plate particles and with a porosity as high as possible to minimize the internal battery resistance. In lead-acid batteries, the separator may also determine the proper plate spacing and thereby may define the amount of electrolyte which participates in the cell reaction. The typical separator has to be stable over the life time of the battery to withstand the highly aggressive electrolyte and oxidative environment.

Beyond these basically passive functions, separators in lead-acid batteries can also actively affect the battery performance in many ways. There are two general classes of lead-acid batteries: flooded cell batteries and valve-regulated lead-acid, commonly abbreviated as VRLA, batteries. In flooded cell batteries, the battery separators typically include porous derivatives of cellulose, polyvinyl chloride (PVC), organic rubber, or polyolefins. Microporous polyolefin separators, such as those marketed by Daramic, LLC of Charlotte, N.C., are often preferred and may contain silica filler which may improve wettability.

For VRLA batteries, two technologies are predominant: batteries with an absorbent glass mat (AGM) and gel separators. The absorbent glass mat, which may be either woven or non-woven, both holds the electrolyte and functions as a separator. In gel batteries, the electrolyte is gelled and immobilized by, for example, fumed silica. Compared to AGM batteries, the manufacturing cost of gel batteries is higher and the specific power is lower due to a higher internal resistance.

In VRLA AGM batteries, electrolyte is absorbed into the AGM separator and held there during the operation of the battery. Material for such AGM battery separators is commonly a glass mat made of insoluble microfine glass fiber materials. Typical specific gravity of the dilute sulfuric acid in a sealed lead acid (SLA)-VRLA battery ranges from about 1.265 to 1.36, and may typically be about 1.28 for VRLA.

The cells of the VRLA AGM battery are each made up of AGM separator, positive and negative electrodes (or plates), and electrolyte. The AGM separators may be wrapped around the positive plate at the bottom to prevent bottom shorts between the positive and negative plates and may extend beyond the side edges of the plate to prevent side shorts and also beyond the top edge if desired. The typical AGM separator is made of almost entirely microfibers of glass (may include coarse and fine fibers) or may contain microfibers of glass and some synthetic fibers. Typical AGM separators are insoluble in water, sulfuric acid or electrolyte. The space formed between glass fibers commonly known as pores or porosity absorbs and retains electrolyte (dilute sulfuric acid or battery grade sulfuric acid) and does not have any extra acid (electrolyte) outside the separator and therefore there is no acid spill in the AGM batteries. This acid starvation allows AGM batteries to be held in either horizontal or vertical positions with no fear of acid spilling or damaging the straps or contacts on the top.

The assembly containing positive and negative electrode with AGM separator in between is typically compressed at about 10 kPa pressure and loaded into the battery enclosure or case. The final AGM separator thickness after compression is lower than the initial thickness and therefore, the final porosity after compression is lower than initial porosity. This compression of the AGM separator is required to keep the positive active material on the positive plate from shedding during operation of the VRLA AGM battery, to keep the AGM separator intact as it is made of loosely held microfine glass fibers, and to maintain the integrity of the battery.

After pressing the AGM separator between electrodes (or plates) and placing the electrode and separator cells inside the battery container, the battery is filled with a predetermined volume of acid (of electrolyte). However, this compression of the AGM separator works against the acid filling process. The reduced thickness and lower porosity of the compressed separator slow down the acid filing process. Such a slow filling process not only increases the cost of battery production, but also can harm the plates and reduce battery function. The pores are the regions that allow acid to be absorbed and held. Although AGM separators have a high porosity (>90% in general, pre-compression), the porosity reduction due to compression works against the speed at which the battery can be filled with acid. If the filling, wetting or soaking ability of the AGM separator is low (due to high compression induced porosity reduction), the top section of AGM separators (when acid is added from the top of the battery container) soak first holding acid which in turn comes in contact with negative plate initiating sulfation (which otherwise happens during discharge of the battery). The premature sulfation of the negative plate results in capacity reduction of the battery (regions not charged when the battery is formed). Therefore the lower porosity and reduced thickness of the compressed AGM separator results in a slow acid filling process with consequent low productivity battery fabrication process, less acid between the plates, and the differential acid contact with the electrodes (top sections over the bottom sections of the electrodes) with consequent sulfation and reduction in battery capacity. The reduction in battery capacity may be the most critical issue with slow acid filling.

Also, if the AGM separator is not sufficiently porous, the electrolyte will not move efficiently through the separator. As a result, filling the area between the electrodes can be difficult. If the separator is not completely saturated with electrolyte, portions of the electrodes may not be in contact with the electrolyte and may not provide ionic conduction. Reduced contact between the electrolyte and electrode may reduce the capacity delivered by the battery and eventually cause the battery to fail. Increased problems including sulfation arise due to longer acid fill times or partial electrolyte fill.

The electrolyte has to displace the air in the pores before occupying the pores. This slow displacement process results in slow acid filling process of the compressed AGM separator. This may be made quicker by being assisted by vacuum. Current VRLA AGM battery manufacturing processes typically require about 30 minutes to fully absorb, fill or wick the electrolyte (acid) into the compressed glass mat, and usually the application of a vacuum is used to slightly accelerate the fill process. Hence, even with vacuum assist, there is still a need for improved absorbent glass mats, improved VRLA batteries, better acid fill rates, and the like. And it is still desirable to minimize the acid fill time (to increase the fill rate) to produce lower cost, higher capacity or longer cycle life VRLA AGM batteries.

SUMMARY

In accordance with at least selected embodiments, aspects or objects, at least the present disclosure may address the above needs, problems and issues associated with conventional AGM separators or batteries, and/or may provide new or improved soluble content absorbent glass mats, better wicking, better fill rates, better absorbent glass mat (AGM) separators for VRLA batteries, improved VRLA AGM batteries, improved VRLA batteries, improved VRLA strings, and/or VRLA or AGM batteries with improved capacity and/or cycle life, and/or novel or improved methods of or for manufacturing, acid filling, use, and/or the like of AGM separators, VRLA batteries, and/or the like, and/or combinations thereof.

In some embodiments, the new or improved soluble content absorbent glass mat (AGM) separators can be used in VRLA batteries, VRLA AGM batteries, and/or VRLA batteries with improved capacity and/or cycle life.

At least some embodiments relate to novel or improved soluble content absorbent glass mats or layers, AGM separators, sealed lead acid (SLA) or VRLA AGM batteries, and/or methods of manufacture, use, acid filing, and/or combinations thereof. At least some embodiments relate to novel or improved soluble content absorbent glass mats or layers with enhanced porosity and/or wettability in a compressed state upon the addition of water, electrolyte or sulfuric acid (solvent), AGM separators, valve regulated lead acid (VRLA) AGM batteries, and/or related methods of manufacture, use, acid filing, and/or the like. At least some embodiments relate to novel or improved soluble content absorbent glass mats, layers, absorbent glass mat (AGM) separators, or a combination thereof, combined with novel or improved soluble content pasting papers, novel or improved soluble content separators, such as nonwoven separators or polyethylene (PE) separators, or a combination thereof.

In accordance with at least selected embodiments, there are provided novel or improved absorbent glass mats, separators, batteries, and/or methods of manufacture, use, acid filing, or combinations thereof; novel or improved absorbent glass mat (AGM) soluble content separators with enhanced porosity and/or wettability, AGM separators, valve regulated lead acid (VRLA) AGM batteries, and/or related methods of manufacture, use, acid filing, or combinations thereof; novel or improved soluble content absorbent glass mats and/or absorbent glass mat (AGM) separators combined with novel or improved soluble content pasting papers and/or novel or improved soluble content polyethylene (PE) separators; the soluble content may be fibers, flakes, particles, and/or the like; and/or combinations thereof.

In accordance with at least certain selected embodiments, the novel or improved absorbent glass mat has soluble content such as soluble fibers, flakes, and/or particles, components, layers, portions, or materials mixed or dispersed in with the insoluble glass fibers, synthetic fibers, or portions thereof, or a combination thereof providing pores in-situ upon dissolution in a compressed state and thereby provides reduced acid fill times, improved methods for manufacturing VRLA batteries, improved batteries, and the like. With some water, acid, or electrolyte, or a combination thereof (generally a "solvent") soluble fibers, microfibers, polymers, salts, flakes, particles, components, portions, other materials, or a combination thereof in the AGM separator (fibers, portions of fibers, particles, or in any other form), new pores are created in-situ by the dissolution of these solvent soluble content, components or portions (fibers, flakes, particles, components, portions, or materials) in contact with the solvent (water, acid, or an electrolyte containing both acid and water) even in a compressed state of the AGM separator. These new pores, channels, or openings preferably instantly or immediately upon contact with solvent (water, acid, electrolyte, or combination thereof) create new pathways for enhanced wicking and filling of acid (electrolyte or battery grade acid) in AGM batteries (as acid contacts the compressed AGM separator, the soluble content or portions dissolve creating more pores, channels or openings), higher porosity, faster filling of an electrolyte, reduce sulfation, and/or a combination thereof.

In accordance with at least other selected embodiments, the novel or improved absorbent glass mat or layer soluble content such as soluble fibers, components, portions, or materials and functions as a second soluble (or partially soluble) layer on top of a first insoluble (or only partially soluble) mat or layer (or AGM separator, pasting paper or PE separator) or covering or enveloping the first insoluble (or only partially soluble) mat or layer (such as a soluble layer on both sides or surfaces of an AGM separator). This second soluble mat or layer is preferably a thin layer, more preferably a very thin or monolayer of soluble fibers or material so that when it dissolves it creates a planar thin open space through which water, acid or electrolyte (solvent) can be wicked or wetted. Another related exemplary embodiment provides a soluble layer with adjacent insoluble or partially insoluble layers disposed on either side or both sides of the soluble layer. As the soluble layer dissolves, an open void is created adjacent or between the insoluble or partially insoluble layers through which solvent may fill, wick or pass through capillary action. The soluble content is broken down, dissolved, solvated, solubilized, becomes part of the electrolyte, or otherwise removed (as gas, liquid, gel, or solid) from the compressed AGM separator (becomes solutes or dissolved components), forming a solution of the soluble content and the electrolyte, acid or water (the original solvent). Such solutions are typically the result of dissolution. In one embodiment, the acid is added or filled first, then water. In another embodiment, the water is added or filled first, then acid. In a yet another embodiment, the electrolyte (battery grade sulfuric acid) is added or filled. When the soluble content, portion or component is a fiber, the dissolution of fiber creates porous regions that resemble a capillary. When the soluble component is a particulate, the dissolution of particles creates pores and may loosen the glass mat. The resultant pores, openings and/or capillary like regions facilitate or enhance acid filling. In AGM separators, the fibers typically go in all directions (see FIG. 1). Those fibers that traverse from top to bottom provide capillary like regions that will wick acid (solvent) and traverse it from bottom to top or vice versa faster than when such capillary regions are not present. Soluble fibers in any direction are helpful because they take the acid quickly to other areas which will otherwise be reached by a restricted flow of acid in the compressed AGM with random distribution of pores. The soluble fibers or portions can be coarse fibers, fine fibers, glass fibers, synthetic fibers; microtine fibers, flakes, particles, pieces, portions, fibers of different lengths, diameters or types, and/or a combination thereof.

The void space (in any shape or format) created by acid soluble or electrolyte soluble fibers, portions, components, or materials helps to not only transport acid, but also retains acid and prevents acid stratification. Further, the initial compression of the new or improved AGM separator can be higher because porosity can be created after assembly during acid filling. Higher compression may provide higher resistance to positive active material shedding.

The in-situ created pores, tunnels or openings will also provide a pathway for oxygen transport from positive to negative plate where it can get reduced to water. The openings or pores thus can help to reduce water loss and drying out of AGM batteries.

The in-situ created pores or openings may also reduce or prevent uneven saturation of acid in AGM separators and acid stratification. The created channels (or pores) provide more efficient diffusion of electrolyte between positive and negative plate and reduce the electrical resistance of the AGM separator even further.

By having resultant or effective higher porosity (after adding solvent) than the typical or conventional AGM separators or mats without the inventive soluble content, portions or fibers, one can envision higher electrolyte availability in porous matrix without compromising the compression needed to prevent positive active material (PAM) shedding.

Even using the inventive higher in-situ porosity AGM, the acid filling process of the improved or new compressed AGM separator may be made quicker by being assisted by vacuum or other means.

In certain embodiments, the improved absorbent glass mat (AGM) separators provide improved acid filing and VRLA battery production methods by providing water, electrolyte, or acid soluble or dissolvable content, materials, fibers, pieces, portions, components, flakes, particles, or a combination thereof in the new or improved mats, layers, absorbent glass mats (AGMs), or AGM separators. It is preferred that at least a portion of the water, electrolyte or acid dissolvable content, materials, fibers, pieces, flakes, components, particles, portions, or a combination thereof dissolve immediately on contact with water, acid, or electrolyte (solvent) during acid fill to provide immediately enhanced porosity, wicking, and quicker acid filing of the VRLA battery with or without vacuum. The present disclosure or embodiments provides or provide heretofore unknown improvements in AGM separator VRLA battery acid filling rates or times. In certain selected embodiments, the acid fill time is surprisingly and preferably reduced by 5%, 10%, 15%, 20%, or 25% or more.

Water soluble or bio-soluble content may necessitate the use of non-aqueous mat or layer production processing such as air entangled, electro-spun, or the like to prevent dissolution of soluble content, fibers or particulates during the mat or layer production process. Acid or electrolyte soluble content are produced by typical AGM wet laid processes using water as the fiber carrier. Bonding additives and other agents or fillers may be added. One filler is silica which can be used to form gel electrolyte.

Disclosed herein are novel or improved absorbent glass mats (AGMs) made of acid or electrolyte insoluble fibers (such as glass fibers with or without other synthetic fibers) blended with other water, acid or electrolyte (solvent) soluble compounds, components, particles, fibers, materials, portions, and/or additives (soluble materials) soluble or dissolvable in water, acid, or electrolyte (solvents), such as sulfuric acid or electrolyte used in VRLA batteries, and in particular preferably used during acid filling of VRLA AGM batteries. Upon exposure of the improved absorbent glass mats to a suitable solvent, the soluble content or portion or materials are dissolved, producing network of pores, channels, capillaries, openings, or voids in the glass mat. Because the compositional ratio (amount), size, shape and distribution of the soluble material or additive that is blended into the acid insoluble glass or synthetic fiber can be controlled, the resulting degree of acid solubility and therefore of degree of creation of porosity, wicking, and wettability can also be controlled.

In-situ enhanced porosity glass fiber mats or layers are useful in a variety of contexts, such as VRLA battery separators, lithium battery separators, filters, fillers, or mats (for example, chemical spill mats, especially acid chemical spill mats, fillers or materials, used to soak chemical spills).

In the context of a VRLA battery separator, the preferred soluble fibers, materials or additives are preferably soluble in acid, so that they dissolve rapidly when the electrolyte is loaded onto and into the compressed, glass mat separator. The dissolution creates additional voids, pores and channels in the otherwise compressed glass mat, facilitating the speedy absorption of the electrolyte. In some embodiments, the water, electrolyte or acid soluble content, portion, component, or additive is a glass and/or synthetic microfiber (at least the glass microfiber preferably containing silicon oxide), preferably silica or glass based fibers but not limited thereto, or containing silicon oxide, aluminum oxide, boron oxide, sodium oxide, potassium oxide, calcium oxide, magnesium oxide, barium oxide, zinc oxide, and/or mixtures or blends thereof.

The soluble material, component or additive may be present in an amount from 0.01-30%, 0.1-25%, 0.1-20%, 0.1-15%, 0.1-10%, 0.1-5%, 0.1-4%, 0.1-3%, 0.1-2%, 0.5-2%, 0.1-1%, 0.25-1%, 0.5-1%, 0.5-1.5%, 0.5-2.0% or 1-2.5% by weight of the new or improved absorptive glass mat or layer.

If the soluble content is synthetic fiber or microfiber, it need not contain silica or other metal oxides. Synthetic fiber can be made of materials that are soluble in acid such as polyvinyl alcohol (PVA) or other soluble synthetic organic polymeric materials. The soluble content can be made of inorganic flakes or particles such as Zinc oxide which is soluble in acid. The $ZnSO_4$ that results upon dissolution also can reduces water loss.

The inventive soluble content component VRLA AGM battery manufacturing processes preferably require less than 30 minutes, more preferably less than 25 minutes, still more preferably less than 20 minutes, and most preferably less than 15 minutes, to fully absorb, fill or wick the electrolyte (acid) into the compressed glass mat, with or without the application of a vacuum. Hence, the present invention may provide improved absorbent glass mats, improved VRLA or AGM batteries, better acid fill rates, reduced or minimized acid fill times (faster fill rates) to produce lower cost, higher capacity and/or longer cycle life VRLA or AGM batteries.

In selected embodiments, the acid filling process is a multi-step process of first adding water or steam, then adding higher concentration acid to reach the typical specific gravity of 1.28.

Novel or improved valve regulated lead acid (VRLA) batteries (including VRLA AGM batteries) may be prepared by combining the inventive blended insoluble and soluble material glass mat separator with an electrolyte. The batteries also contain at least two oppositely charged electrodes, the electrolyte, and the separator compressed in between the electrodes. Because the separator is prepared from a glass mat having an acid soluble portion, material, component or additive, the electrolyte in the filled battery is further characterized by the presence of the dissolved component or additive or the products of dissolution.

To apply the positive active material (PAM) layer on the positive electrode, the industry has a few variations, one such variation being "pasting paper." Typical PAM pasting paper has or is on an insoluble fiber base. In accordance with one embodiment, a new or improved pasting paper has soluble content or has a base made totally of soluble fiber. Once the PAM is applied to the positive plate or grid, the new or improved pasting paper base and/or the new or improved AGM separator stays on top of the PAM and provides vibration resistance and compression benefit. The first glass, fiber, particle, or combination layer next to the PAM provides PAM shedding prevention or support in addition to acting as a carrier for PAM.

The new or improved PAM base or carrier with soluble content such as soluble fibers, particles, materials, portions, or the like may also create in-situ channels or openings between the new or conventional AGM and PAM. Such channels or openings can facilitate quicker acid filling and improve battery performance. During typical PAM pasting processes, the lead acid battery industry adds some sulfuric acid to the paste to bond. With the improved soluble fiber pasting paper base, then the industry may just use water in the PAM instead of acid.

In any embodiment disclosed herein of a mat, layer, fibrous mat material (FMM), or AGM, new or improved soluble content pasting paper, new or improved soluble content PAM carrier or base, or of a new or improved soluble content separator or PE separator may contain fibers, flakes, pieces, content, particles, portions, materials, components, additives, or any combination thereof, any of which may be soluble or non-soluble.

The soluble content of the new or improved soluble content mat, layer, fibrous mat material (FMM), or AGM, new or improved soluble content pasting paper, new or improved soluble content PAM carrier or base, or of a new or improved soluble content separator may be any known insoluble and soluble fibers or materials that do not harm the battery, can be used in the mat, layer, FMM, AGM, pasting paper, or separator, and which preferably dissolve quickly in water, steam, acid, dilute acid, or electrolyte (solvent). In one embodiment, the soluble content may be particles, particulate, or fibrous material. The fibrous material may be nonwoven, mesh, woven, knit or combed material, or a combination thereof. The soluble content may be a blend of solvent dissolvable content and non-acid dissolvable content. The solvent dissolvable content may be any component that is dissolvable in the constituents of the battery's electrolyte (in the lead acid battery, this acid is typically a solution of sulfuric acid and water). In one embodiment, the dissolvable content may be water soluble content, acid soluble content, bio-soluble content, soluble glass content, soluble synthetic content, soluble suture material, cellulosic fiber, polyamide (e.g., nylon) content, content with soluble portions, co-polymers thereof, or mixtures or blends thereof.

BRIEF DESCRIPTION OF THE FIGURES

The above and other embodiments, aspects, objects, features, or advantages of the present disclosure or embodiments will become more apparent and will be readily appreciated from the following detailed description of the exemplary or preferred embodiments, aspects, objects, features, or advantages of the disclosure taken in conjunction with the accompanying figures.

FIG. 1A depicts an AGM with both soluble fibers and/or particles present as well as non-soluble fibers and/or particles. FIG. 1B depicts the same AGM as shown in FIG. 1A after it has been exposed to acid, electrolyte, water, or a combination thereof.

DETAILED DESCRIPTION

Figure 1B:
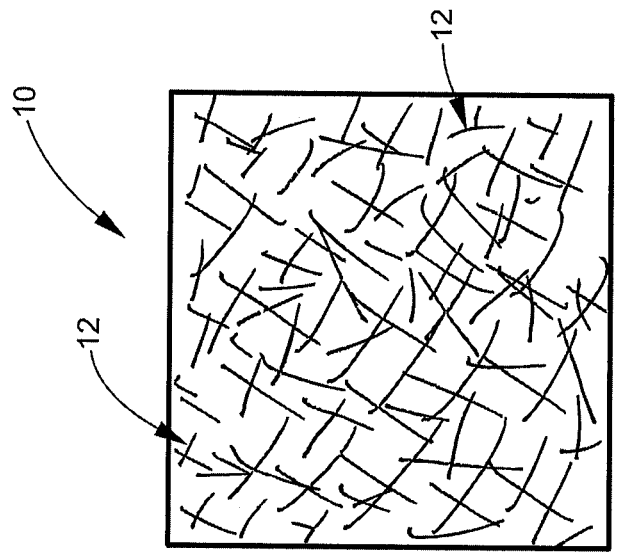
FIGS. 1A and 1B are schematic illustrations of an exemplary embodiment of the novel or improved soluble content mat, AGM, AGM separator, or layer having soluble and insoluble fibers and when subjected to water, electrolyte, acid, or a combination thereof increases in porosity and wettability due to the soluble fibers being dissolved, solubilized or broken down to increase porosity, wettability, open channels, to reduce the acid fill time (typically the mixed fiber separator is installed compressed between electrodes in the battery or casing, then acid is added, the acid dissolves the soluble fiber from the top of the battery towards the bottom, and the acid is filled more quickly than usual due to in-situ pores, channels or openings). If the acid is filled from bottom to top, the fibers and soluble content dissolve and provide channels and pores for quick upward wicking and movement of acid.

As mentioned above, in accordance with at least selected embodiments, aspects or objects, the present disclosure may address the above needs and issues, and may provide novel or improved mats, layers, absorbent glass mats, separators, batteries, and/or methods of manufacture, use, acid filing, and/or the like. In accordance with at least certain embodiments, aspects or objects, the disclosure relates to novel or improved soluble content mats, layers, absorbent glass mats (AGMs) or AGM separators with enhanced porosity and/or wettability, other separators, pasting papers, valve regulated lead acid (VRLA) AGM batteries, and/or related methods of manufacture, use, acid filing, and/or the like. In accordance with at least other embodiments, the disclosure relates to novel or improved soluble content mats, layers, absorbent glass mats and/or absorbent glass mat (AGM) separators combined with novel or improved soluble content pasting papers and/or novel or improved soluble content polyethylene (PE) separators.

As used herein, the term "compressed absorbent glass mat" or "compressed AGM" or "compressed AGM separator" refers to inventive soluble content mats, AGM, or AGM separators that have at least some soluble content, portion, or layer (for example: between 0.001 to 20%; 0.01 to 20%; 0.1 to 30%; or 0.1 to 100% soluble content by weight or volume) and that are compressed between the electrodes or otherwise installed in a SLI, VRLA, AGM, or VRLA AGM battery or battery case prior to or before acid filling or addition of or exposure to the suitable solvent or solvents for dissolving, solvating, or partially dissolving or solvating the soluble content. In addition, as used herein, the term "solvent" refers to, for example, water, steam, electrolyte, battery grade acid, acid, such as sulfuric acid, or any combination thereof. Further, as used herein, any content or component described by the terms or phrase "soluble," "dissolvable," or "partially soluble," refer to, for example, fibers, particles, portions, materials, components, additives, or any combination thereof. Moreover, as used herein, any content or component described by the terms or phrases "insoluble," "dissolvable," "partially insoluble," or "non-soluble," or "non-dissolvable," or variants thereof refer to, for example, fibers, particles, portions, materials, components, additives, or any combination thereof.

The new or improved soluble content mats, layers, absorbent glass mats, or AGM separators may provide better wicking, better fill rates, better battery life, better battery capacity, better absorbent glass mat (AGM) separators for VRLA batteries, better SLA or VRLA batteries, better VRLA AGM batteries, VRLA batteries with improved acid fill efficiency and reduced failure rate, and/or new or improved methods of or for manufacturing, acid filling, use, and/or the like of AGM separators, VRLA batteries, and/or the like.

In some embodiments, the improved absorbent glass mat (AGM) separators can be used in VRLA batteries, VRLA AGM batteries, VRLA batteries with improved production efficiency, enhanced cycle life and reduced fail-rates. The improved absorbent glass mat separators can provide an improved method for manufacturing VRLA batteries.

In certain embodiments, the improved absorbent glass mat (AGM) separators provide improved acid filing and VRLA battery production methods by providing water, electrolyte or acid dissolvable materials, fibers, particles, portions, and/or the like in the improved absorbent glass mat (AGMs) and/or AGM separators. It is preferred that at least a portion of the water, electrolyte or acid dissolvable materials, fibers, portions, and/or the like dissolve immediately on contact with water, steam, acid, or electrolyte during acid fill to provide immediate enhanced porosity, wicking, and quicker acid filing of the VRLA battery with or without vacuum. The present disclosure provides heretofore unknown improvements in AGM separator VRLA battery acid filling rates or times. In certain selected embodiments, the acid fill time is surprisingly and preferably reduced by 5%, 10%, or 25% or more.

Disclosed herein are improved absorbent glass mats made of insoluble fibers (such as glass fibers with or without other synthetic fibers) blended with other soluble fibers, portions, particles, materials, and/or additives soluble in one or more different solutes. Upon exposure of the improved absorbent glass mats to a suitable solute, the soluble fibers, portions, particles, materials, and/or additives are dissolved, producing voids in the glass mat. Because the amount and shape of the soluble content that is blended into the in-soluble glass and/or synthetic fiber can be controlled, the resulting degree of porosity, wicking, and wettability can also be controlled. The porous glass fiber mats are useful in a variety of contexts, such as VRLA battery separators and filters.

Figure 1A:
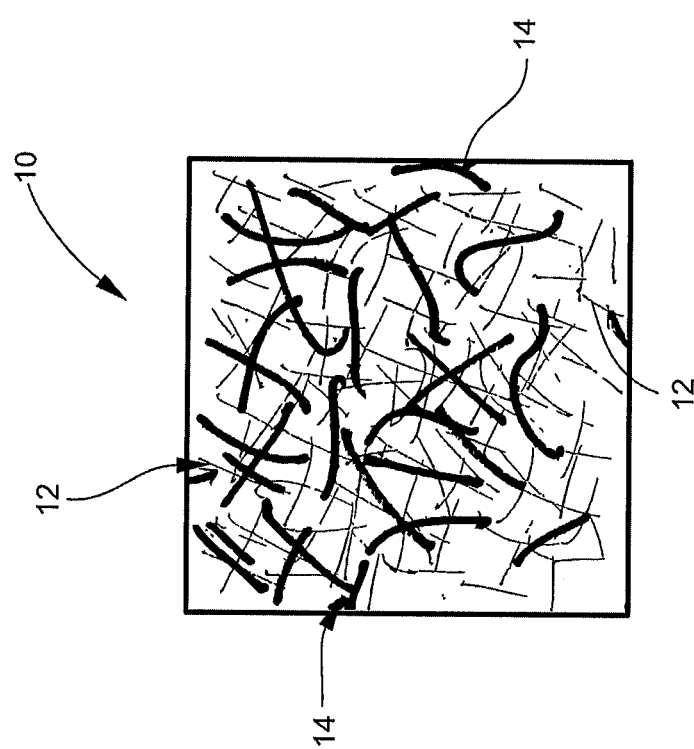

Referring to FIG. 1A, an improved AGM 10 is depicted as being made of non-soluble fibers and/or particles 12, as well as soluble fibers and/or particles 14. FIG. 1B shows the same AGM 10 after exposure to acid, electrolyte, water, or a combination thereof. In FIG. 1B, it is appreciated that the soluble fibers and/or particles have dissolved and are therefore not depicted in FIG. 1B.

Typical VRLA batteries use a fibrous mat material (FMM) separator between the electrodes. A widely used FMM for this purpose is an absorbed or absorbent glass mat (AGM). The AGM is typically a non-woven fabric comprised of glass micro-fibers that retain the electrolyte by capillary action, but also provide space for gas diffusion as long as the matrix is not fully saturated with electrolyte. The electrolyte is still free to move within the fiber matrix, but is more confined than in a flooded cell. Another fibrous material is a non-woven mat constructed from a polymeric component such as polypropylene or polyethylene or polyester.

Figure 2:
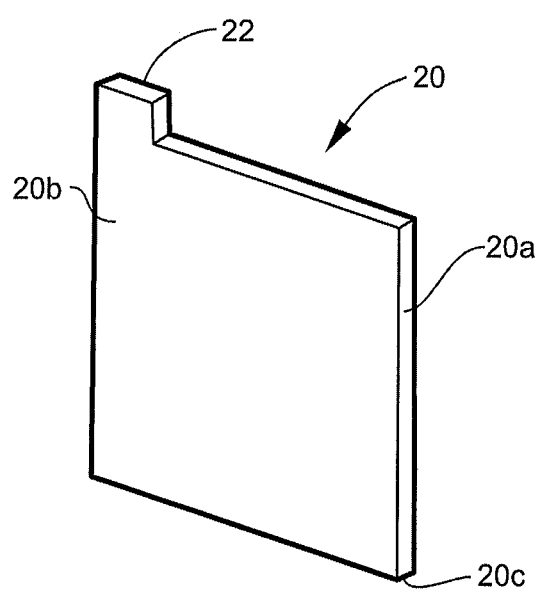
FIG. 2 is a schematic isometric view of a plate or electrode used in a VRLA AGM battery.

The performance of VRLA batteries using FMM or AGM separators may be degraded over time for several reasons. These include short circuits between battery cell plates. The short circuits can occur along exposed plate side walls and also by dendritic short circuits between plate surfaces. This problem is exacerbated if the edges of the fibrous mat separator material are not aligned in close registration with the edges of the plate. Misalignment can occur during battery manufacture as the plate-fibrous material combination is inserted into temporary containers called "burning boxes" for casting of internal plate straps. This problem has been addressed in the past by providing reinforcing straps and films to hold plates and fibrous material in registration. This approach is expensive and requires additional manufacturing steps. These problems were addressed by providing wider separators, pockets, envelopes, wrapping both electrodes, wound sleeves, and the like for installing fibrous separator material such as FMM and AGM between the plates of a VRLA battery cell. FIG. 2 is a schematic representation of a typical VRLA battery cell plate 20. In this instance, the plate has a generally rectangular shape and includes a lug 22 connected electrically to a battery terminal using a cast strap (not shown). The plate also includes vertical side walls 20a, 20b and a bottom edge 20c. The plate further includes opposing flat faces and PAM.

Figure 3:
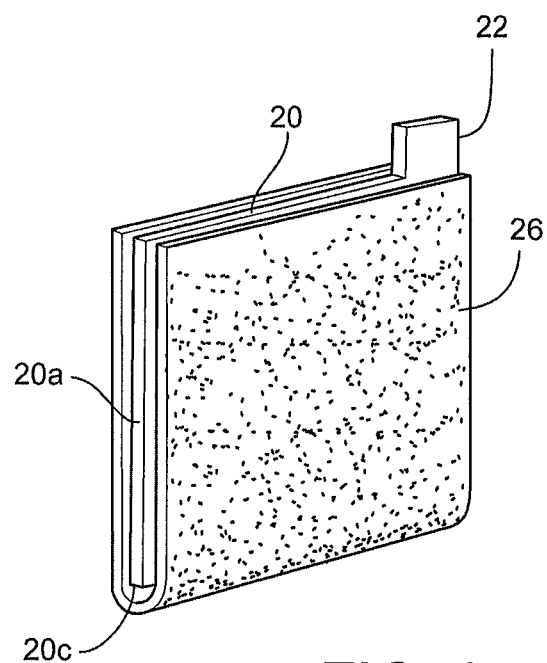
FIG. 3 is an isometric view of the plate depicted in FIG. 2 showing a "U-wrap" or bottom wrap (or pocket or envelope) embodiment or method of wrapping a sheet of fibrous separator material around the bottom of the plate.

The FMM or AGM material may be wrapped around the plate as shown in FIG. 3. A sheet of AGM material 26 is wrapped around the bottom edge 20c of the plate 20 and extends upwardly along the opposing plate faces towards the top of the plate. This approach leaves both vertical side walls 20a, 20b exposed and more susceptible to plate-to-plate short circuits. This may be addressed with wider AGM material and/or edge seals. Moreover, it will be readily appreciated that the FIG. 3 wrapping technique may leave two exposed, loose edges of AGM material that may be difficult to keep aligned with the plate itself during assembly of the battery cell. The assembly of the battery cells for some applications is accomplished by hand. This is particularly true for cells used for motive power applications. Maintaining the proper alignment between the plates 20 and the AGM material 26 is difficult as the plate-AGM combination goes through a series of battery cell manufacturing steps. This problem has been addressed by incorporating some type of sheath or restraining means surrounding the AGM material. The resulting extra cost and additional manufacturing steps are disadvantageous.

Other wrapping techniques may provide several advantages for the construction of VRLA battery cells: increased electrolyte carrying capacity so as to increase battery capacity and life, advantageously reducing the amount of plate-separator misalignment that can occur during battery cell manufacture, and correcting the alignment problem may reduce substantially short circuits that can shorten battery cell life.

A typical VRLA battery construction includes a container; a set of positive plates positioned in the container, each of the positive plates having vertical side walls; and a set of negative plates arranged in alternating order with the positive plates. Each of the negative plates and the positive plates have opposing vertical side walls. The plate separators (FMM or AGM) are wrapped completely around the positive or the negative plates such that the bottom and/or vertical side walls of the wrapped plates are covered with at least a single layer of separator material.

In certain embodiments, each plate separator includes first and second sheets (or layers) of fibrous material. The sheets may each have an exposed vertical side edge and a wrapped vertical side edge. The sheets may be wrapped around the plates such that the wrapped vertical side edge of the first sheet underlays the second sheet and the wrapped vertical edge of the second sheet underlays the first sheet.

In an alternative embodiment, the first sheet is wrapped around a first vertical side wall of the plate and second sheet is wrapped around an opposing second vertical side wall of the plate. The second sheet overlays the first sheet such that the first sheet vertical side edges are covered by the second sheet. The second sheet's vertical side edges are exposed.

In yet another alternative embodiment, each plate separator is comprised of a single continuous sheet of fibrous material having two vertical side edges. The material is wrapped around the wrapped plates such that one of the side edges is substantially covered by the wrapped material and a single side edge is exposed.

In one embodiment, the improved mat or AGM is C-wrapped over the positive plate bottom edge. In another embodiment, the improved mat or AGM is C-wrapped over the positive plate bottom edge and is serpentine wrapped from the positive to negative so there is always a layer of mat or AGM around at least one edge of two juxtaposed plate edges (bottom, top, bottom, top, . . . ).

One method for installing a fibrous separator between alternating positive and negative plates of a lead-acid battery cell includes aligning a first vertical edge of a single continuous sheet of fibrous separator material in substantial registration with a vertical side wall of each of the positive plates or the negative plates and wrapping the continuous sheet of fibrous separator material around the plates so as to create a pair of inner layers of separator material on opposing sides of the plate. Then the continuous sheet of fibrous separator is wrapped around the pair of inner layers so as to form a pair of outer layers of separator material overlaying the inner layers. When the wrapping is complete a second vertical edge of the continuous sheet of fibrous separator material is in substantial registration with the vertical side wall of the plate.

Another method for installing a fibrous separator between alternating positive and negative plates of a valve regulated lead acid battery includes placing a first sheet of fibrous mat material atop a second sheet of fibrous material so that the sheets are in vertical and horizontal registration. The first and second sheets have substantially the same dimension and have opposing first and second vertical side edges. A flat battery cell plate having first and second opposing vertical side walls is placed atop the two sheets such that one of the side walls is aligned with the first vertical side edge of the first sheet. The second side edge of the first sheet is pulled across the plate so that the first and second vertical side edges of the first sheet are substantially in alignment with the plate first side wall. The opposing second side wall of the plate is then covered with a wrap of the sheet material and the first side wall of the plate is exposed. The plate is slid across the bottom sheet such that the plate second side wall is in substantial vertical alignment with the second vertical side edge of the second sheet. The first vertical side edge of the second sheet is pulled across the plate and underneath the portion of the first top sheet covering the top of the plate.

Such constructions and methods may decrease the amount of plate-to-plate short circuits that occur during the life of a VRLA battery, improve the reliability of VRLA batteries by, among other things, creating a high degree of consistency between plates in a high volume manufacturing process, and/or reduce the manufacturing costs of VRLA batteries.

Figure 4:
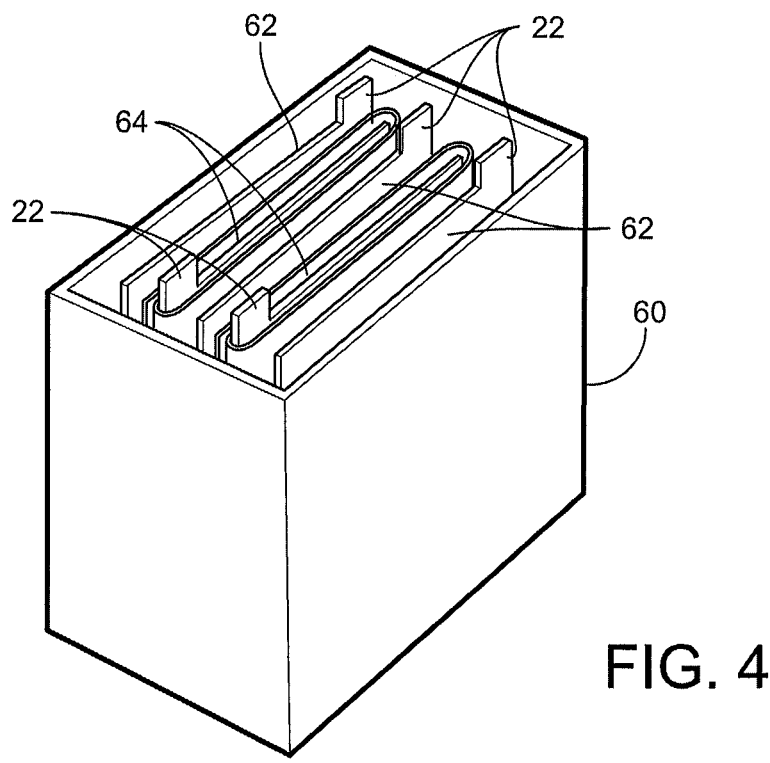
FIG. 4 is an isometric view of a battery cell container holding alternating positive and negative plates therein with a "C-wrap" or "Spiral Wrap" or sleeve embodiment or method of wrapping the sheet or sheets of fibrous separator material around the plates (and/or a "U-wrap", bottom wrap, pocket or envelope embodiment or method could also be used).

Turning now to FIG. 4, there is illustrated a plurality of cells in a casing or container 60, sometimes referred to in the art as a "jar," which holds at least one flat negative plate 62 and at least one flat positive plate 64. In this embodiment there are two positive plates 64 and three negative plates 62. As was discussed above, each plate contains a lug 22 for connection to a cell terminal. The cell cover and terminals are not shown in this view for clarity and to illustrate the internals of the cell. The plates 62, 64 may be constructed according to conventional plate-making technology. It will be readily appreciated that the lugs 22 of the negative plates 62 and the positive plates 64 have been aligned with each other. Given the alternating positive-negative plate arrangement, lugs for the negative plates 62 are in registration on one side of container 60 and the lugs for the positive plates 64 are in registration on an opposite side of container 60.

Figure 5:
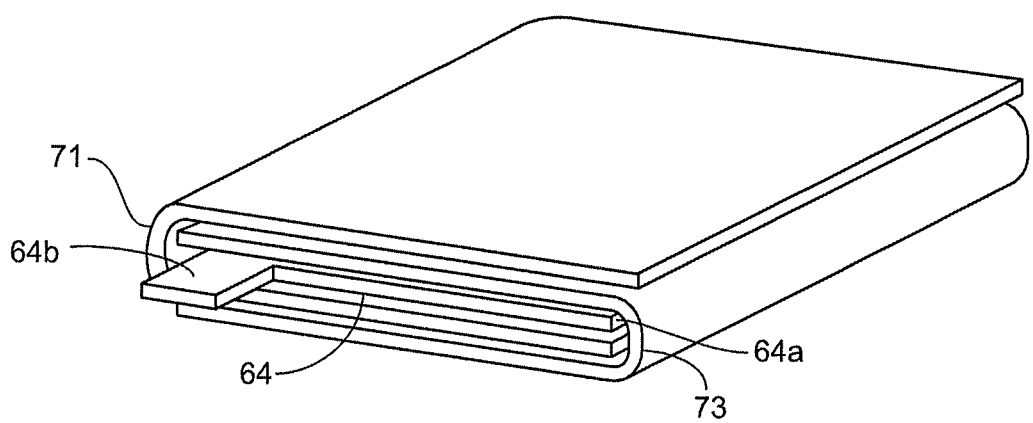
FIG. 5 is an isometric view of a battery cell plate wrapped according to a "C-wrap" or sleeve embodiment or method of wrapping a sheet or sheets of fibrous separator material around the plate.
Figure 6:
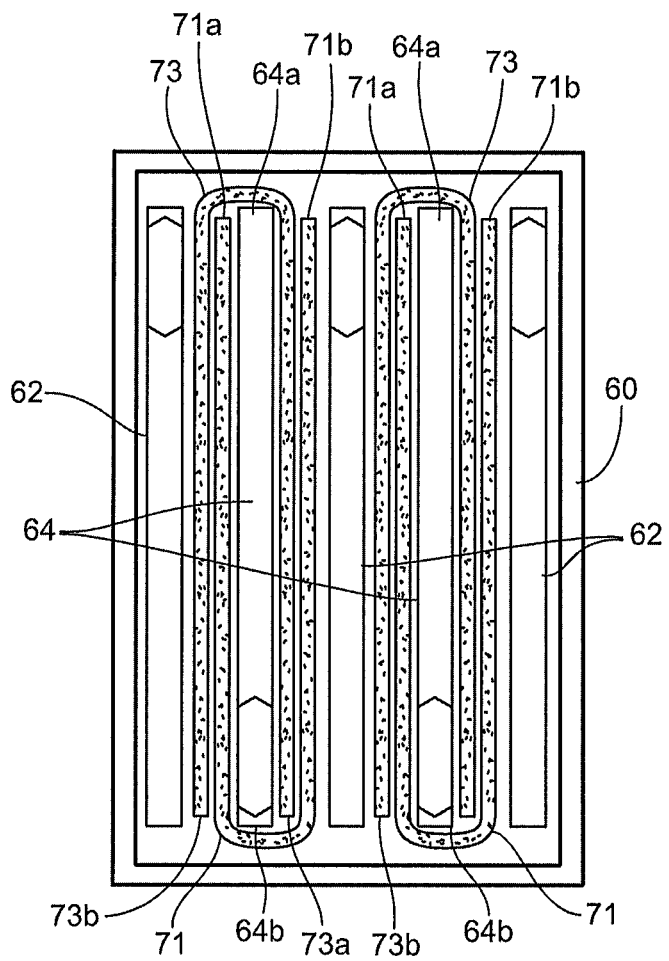
FIG. 6 is a top view of a battery cell container holding alternating positive and negative plates wrapped as shown in FIG. 5 therein.

Turning now to FIG. 6 there is illustrated a top view of battery cell container 60. An isometric view of a wrapped positive plate is depicted in FIG. 5. As described above, the container 60 includes 3 negative plates 62 and 2 positive plates 64. Typically, the number of negative plates 62 is one more than the number of positive plates 64 and the alternating arrangement of plates begins and ends with negative plates 62. The positive plates have been wrapped with a fibrous separator comprising an interleaving, offset "C-wrap." The separator includes a first sheet 71 and a second sheet 73 each having one wrapped side edge 71a, 73a and one exposed vertical side edge 71b, 73b. It will be readily appreciated that the first sheet wrapped side edge 71a and the second sheet wrapped side edge 73a underlay the second and first sheets 73, 71 respectively. The two exposed side edges 71b, 73b do not present an alignment problem because each sheet 71, 73 has a side edge that is tucked under a wrapped layer and thus held in place and in proper alignment with the plates 64. This arrangement provides a layer of fibrous mat material surrounding each of the plate edges 64a, 64b. Further, two layers of fibrous mat material are provided between each positive plate 64 and the adjacent negative plate 62.

The method for wrapping a battery cell plate according to this embodiment includes first placing a first sheet of fibrous material atop a second sheet of fibrous material such that the sheets are in vertical and horizontal registration. The sheets have substantially the same dimension and include first (right) and second (left) vertical side edges. The width of the sheet may be selected to be slightly greater than twice the width of the plate to be wrapped. By way of non-limiting example, for a plate having a width of about 5.625 inches, a sheet having a width of about 12.0 inches may be used. As discussed above, the plate has opposing first (right) and second (left) vertical side walls.

The plate is placed atop the two sheets with the right side wall of the plate aligned with the right vertical side edges of the two sheets. The left edge of the top sheet is pulled across the top of the plate so that the vertical side edges of the sheet are substantially in alignment with the right side wall of the plate. It will be appreciated that at this point the left side wall of the plate is covered with a wrap of the sheet material and that the right side wall of the plate is exposed. The once-wrapped plate is then slid across the bottom sheet such that the wrapped left plate side wall is in substantial vertical alignment with the left vertical side edge of the bottom sheet. The right edge of the bottom sheet is picked up and pulled across the plate underneath the portion of the top sheet covering the top of the plate. In order to accomplish this, it may be necessary to lift the upper folder portion of the top sheet so that the folded portion of the bottom sheet may be inserted thereunder. Generally, this embodiment provides a more robust cell assembly.

The advantages of this plate wrapping technique include the use of a smaller sheet of FMM or AGM to wrap the plate. It has been found that a larger sheet may sometimes present handling challenges for assembly line fabricators. Another advantage stems from the use of equal-sized sheets of FMM. This reduces manufacturing costs because only one size of sheet material need be inventoried. It has been found that this embodiment is better adapted for hand assembly of the cells even though it includes two exposed vertical side edges of fibrous mat sheet material. The exposed edges are not problematic because one side edge of each sheet is locked in place under a wrap formed by the other sheet.

Figure 7:
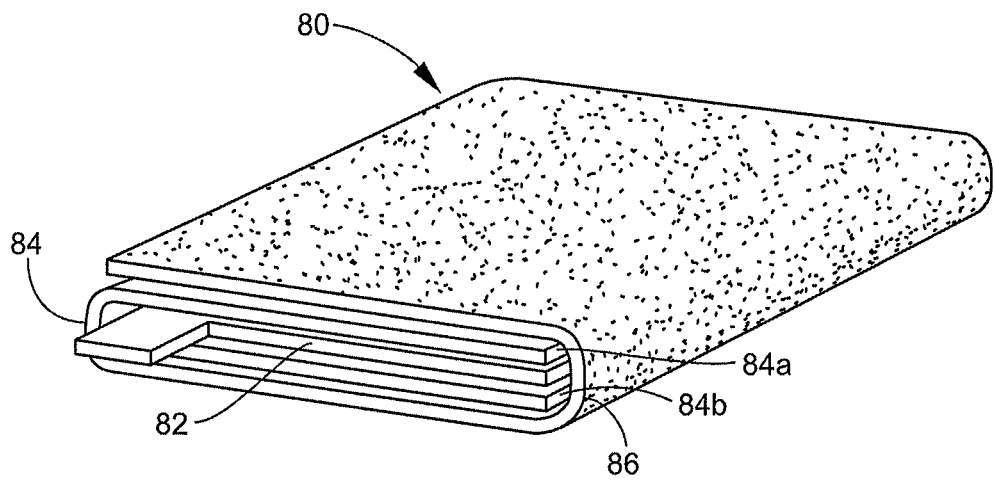
FIG. 7 is an isometric view of a battery cell plate wrapped according to an alternative "C-wrap" or sleeve embodiment or method.

It will be readily appreciated that with a slight modification to the procedure described above the two sheets of fibrous mat material could be folded such that one of the two sheets would envelop the other as illustrated in FIG. 7. This alternative embodiment 80 includes a flat plate 82 which is wrapped with an inner sheet 84 and is then over wrapped with an outer sheet 86. This embodiment, though functional, is not as preferred because the outer sheet 86 must have a greater length than the inner sheet 84 because it must wrap both the plate 82 and the inner sheet 84. Accordingly, two different sizes of fibrous mat material must be inventoried thus increasing manufacturing costs. Moreover, it is believed that the vertical side edges 84a, 84b of the inner sheet 84 will not lay flat against the plate 82.

Figure 8:
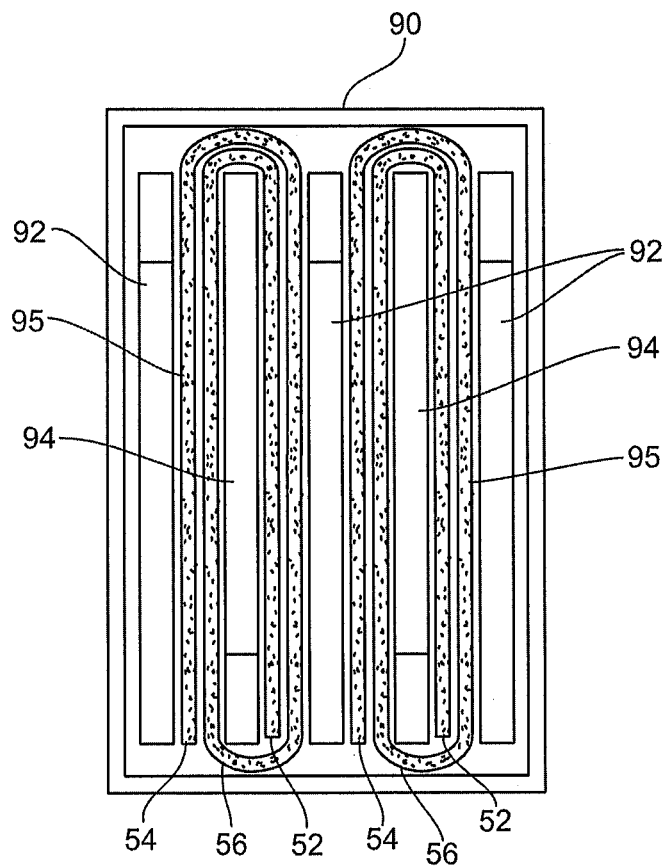
FIG. 8 is a top view of the battery cell constructed according to an alternative "Spiral Wrap" or sleeve embodiment or method.

Another alternative embodiment is illustrated in FIG. 8 which is a top view looking down into a container 90. The positive plates 94 are wrapped with a single continuous sheet of FMM or AGM material 95. The AGM material 95 is wrapped around each positive plate 94 so as to provide two layers of AGM material on each side of the plate 94 for a total of four layers. These four layers include a pair of inner layers directly adjacent to the plate opposing sides and a pair of outer layers overlaying the inner layers. The pair of inner layers and the pair of outer layers are joined in continuous fashion by a U-shaped section 56 of AGM material.

This continuous wrap is accomplished by aligning the first vertical edge 52 of the continuous sheet 95 substantially in registration with a vertical side wall of the plate 94. Next, the AGM sheet 95 is wrapped a first time around the vertical height dimension of the plate 94 to create the pair of inner layers of separator material on opposing sides of the plate 94. Then the AGM sheet 95 is wrapped a second time to create a pair of outer layers overlaying the inner layers such that the second vertical edge 54 of the continuous sheet 95 of separator material is substantially aligned with the vertical side wall of the plate 94. It will be appreciated that because a continuous sheet of AGM material is used to create all four layers, there is no discrete transition between layers. The inner layers are joined to the outer layers by U-shaped portion 56.

When wrapped about a plate 94 according to this alternative embodiment, one of the two vertical edges of the AGM sheet 95 will be covered by the wrapped material leaving a single vertical edge 54 exposed. The covered vertical edge 52 is held in place securely by the outer wrap of AGM material. Having been so locked in place, this vertical edge 52 does not present a handling or alignment problem.

Suitable soluble content mats, layers, fibrous mat material (FMM), or absorbent glass mat (AGM) separators may be used in the practice of the present disclosure and can be selected according to the battery's or cell's proposed use, size, environment, handling, or the like. A typical size AGM material suitable for use in the present disclosure may be a soluble content mat or separator with a surface area of about 1.25 m$^2$/g, in thicknesses ranging from about 1.07 mm to about 3.02 mm, or the like depending on the plate size, wrapping method, or the like.

Other types of soluble content non-glass separators or mats may also be used in the practice of the present disclosure. A non-limiting example is constructed from an in-soluble polymeric material such as polypropylene or polyester and a soluble component, particles, fibers, portions, or a combination thereof. Good wetting characteristics, fine fiber diameters, high porosity, high tensile strength, or a combination thereof, may be preferred.

It should be understood that FIGS. 4, 6 and 8 discussed above show a partially-assembled battery. The container 60, plates 62, 64, and the fibrous material sheets 71, 73 (FIG. 6) typically are positioned vertically during assembly of the cell components. It will be readily appreciated that when the AGM battery is put into service it may have a horizontal orientation (See FIGS. 5 and 7) so that the "vertical" side edges will lie horizontally as the battery is discharged. Thus any references herein to a vertical side edge or side wall do not limit the end application of a separator, cell or battery.

Batteries or cells constructed according to the present disclosure may be used in the vertical or horizontal position. Also, the in-situ pores, opening, and channels of the present disclosure may provide for vertical use and/or a higher height of the plates and separators as they may reduce or address any height related electrolyte stratification issue or problem.

It should be understood further that although described herein to show the separator material wrapped around the positive plate, the wrapping may likewise apply to wrapping of the negative plate. Alternatively, there may be designs in which both the positive and negative plates are wrapped in the same or different fashions or with different materials One advantage of the opposed "C-wrap" and continuous wrap embodiments is the provision of an extra portion 56 (FIG. 8) of electrolyte-carrying fibrous material as compared to the "U-wrap" described above (FIG. 3). Any opportunity to increase the amount of electrolyte carried in a given container 60 may provide battery performance and battery life improvements. Designers of VRLA batteries may strive to store as much electrolyte as possible in the cells. The inventive soluble content may help to store more acid and may be one of the benefits of the inventive embodiments.

With reference again to FIGS. 3 and 8, the sheet of AGM material 26 and sheet of AGM material 95 may each preferably be single or multilayer sheets, separators or composites of soluble content mat, soluble content layer, soluble content AGM, AGM with a soluble content layer or surface, soluble content AGM/soluble content PE separator, soluble content AGM/PE separator combination, or a sandwich of soluble content AGM/soluble content PE separator/soluble content AGM, soluble content AGM/PE separator/soluble content AGM, soluble content AGM/PE separator/AGM, or a combination thereof.

With reference again to FIGS. 4 to 7, the sheets of AGM material 71 and 73, and 84 and 86, respectively, may each preferably be mats, layers, single or multilayer sheets, separators or composites of soluble content mat, soluble content layer, soluble content AGM, AGM with a soluble content layer or surface, soluble content AGM/soluble content PE separator, soluble content AGM/PE separator, or a sandwich of soluble content AGM/soluble content PE separator/soluble content AGM, soluble content AGM/PE separator/soluble content AGM, soluble content AGM/PE separator/AGM, or a combination thereof. For example, each of sheets 71 and 73 may be a soluble content mat, soluble content layer, soluble content AGM, AGM, PE membrane, or soluble content PE membrane, and each of 71 and 73 may be the same or different materials. In a further exemplary embodiment, sheet 84 may be pasting paper or soluble content pasting paper, and each of sheets 84 and 86 may be a soluble content mat, soluble content layer, soluble content AGM, AGM, PE membrane, or soluble content PE membrane, and each of 84 and 86 may be the same or different materials.

Figure 9:
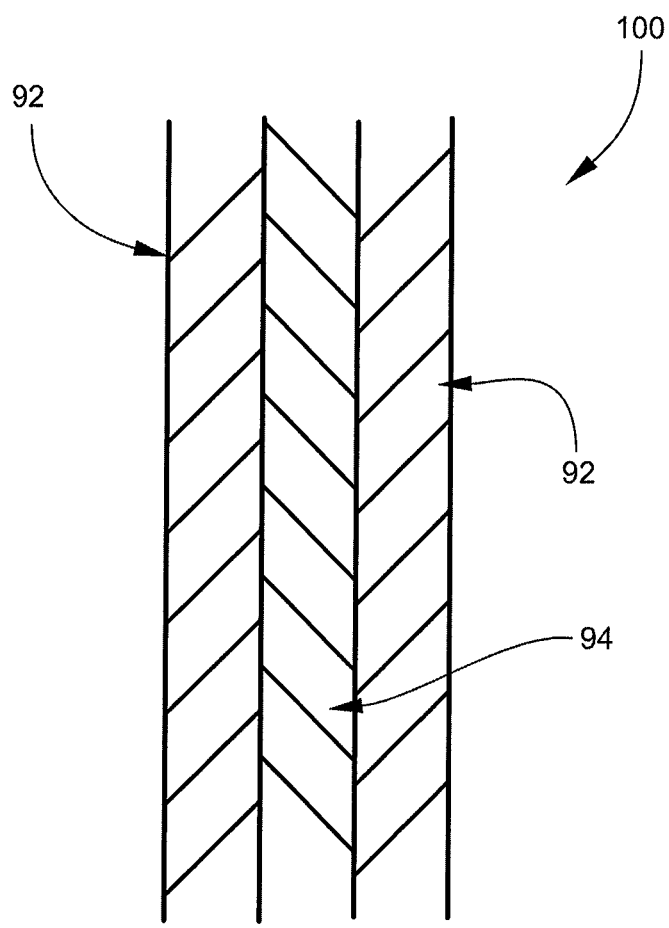
FIG. 9 illustrates an exemplary embodiment or separator.

Another exemplary embodiment is depicted in FIG. 9. A separator or precursor 100 is shown made up of a first two layers 92 of fibers and/or particles that may be insoluble or a combination of soluble and insoluble components. These first two layers 92 are adjacent on both sides of a second layer 94 of soluble material (or of soluble and insoluble content). When the separator 100 is exposed to acid, electrolyte, water, or a combination thereof, the second layer 94 dissolves and leaves a 2-dimensional space of void of thickness approximately equal to the dissolved layer between the first two layers 92. This void creates additional space through which solvent may wick, wet, or pass through by capillary action. The 2-dimensional space spreads acid quickly (like how a droplet of water on a slide surface spreads as a sheet of water when another slide surface is placed on it).

An alternate arrangement is also possible. Layers 92 may be soluble and layer 94 may be non-soluble. By having a soluble layer on either side of insoluble AGM, we can form a thin 2-dimensional space that wicks and spreads acid close to where it is needed first, right next to the electrode. When electrolyte spreads uniformly over the surface of the electrode, the sulfation issue may be eliminated.

The possibly most preferred soluble content absorbent glass mats or AGM separators disclosed herein may contain at least two components: conventional insoluble components (such as glass fibers), and soluble or partially soluble content (such as glass or synthetic fibers that are soluble or partially soluble in a solvent).

Generally all glass fiber materials known in the art for producing glass mats, absorptive glass mats or AGM separators may be used as the insoluble or low solubility glass fiber content. In some embodiments, the fibrous material mat (FMM), layer or AGM is a soluble or partly soluble content absorptive microfiber glass mat or fleece that is provided with or without organic components like binder or polymeric fibers. In some examples, the fibers have a diameter ranging from 0.1 to 10 µm, or from 0.01 to 5 µm. The fibers can be blends of soluble or partly soluble fibers and of insoluble, low solubility or partly insoluble fibers (such as acid-resistant glass fibers) of various diameter. For example, the fiber blend can include extremely thin fibers with an average fiber diameter below 1 µm, referred to as microfibers, and "coarse" fibers with an average diameter of 2-5 µm. The microfibers increase the internal surface area, improve the tensile strength, and decrease the pore diameter of the mat or AGM but can increase the product cost. The larger fibers facilitate battery acid filling by creating larger pores that provide faster acid pick-up, often referred to as faster or better wicking rate.

In certain embodiments, the fibrous mats or layers can comprise 20 to 40% by weight of glass and/or synthetic microfibers having an average diameter of less than 1 µm and 60 to 80% by weight of coarse glass and/or synthetic fibers having an average diameter of 2-5 µm, for instance 30% by weight microfibers and 70% by weight coarse fibers. Certain conventional insoluble glass fibers, glass fiber mats and the preparation thereof are known (see for instance Böhnstedt W., in Handbook of Battery Materials, Editor Besenhard J. O., Wiley-VCH, Weinheim 1999, pages 245 to 292 and literature cited therein).

In particular embodiments, the particular glass and/or synthetic fibers may be characterized as having a high solubility in acid, a partial solubility in acid, a low solubility in acid, or no solubility in acid. In some instances, the fibers may be insoluble or soluble glass fibers and have an average fiber diameter of 0.05-5, 0.1-2.5, 0.1-2, 0.1-1, 0.1-0.5, 0.2-0.4 (such as JM 481-100), 0.4-0.6 (such as JM 481-104), 0.5-0.7 (such as JM 481-106), 2.5-3.0 (such as JM 481-110x), and/or 3.5-4.5 microns (such as JM 481-112x).

The soluble content (soluble or partially soluble or swellable or gellable) may include any number of different materials such as glass, organic or inorganic polymers, inorganic salts, organic compounds, additives, binders etc. and in shapes or forms such as fibers, layers, particles, flakes, pieces, portions, components, or a blend, mixture or combination thereof provided that it is bio-soluble, soluble, or partially bio-soluble or soluble in at least one suitable solvent (such as water, steam, acid, dilute acid, or electrolyte). The soluble content may be a combination of any of the foregoing classes of materials. The soluble content may be in any of the foregoing shapes or forms.

Suitable fibers for the soluble content for at least selected embodiments include soluble or partially soluble inorganic, organic, natural, synthetic, recycled, pristine, polymeric and/or glass microfibers. In certain embodiments, these microfibers have an average fiber length of less than 1.5, less than 1.25, less than 1.0, less than 0.75, less than 0.5, less than 0.25, or less than 0.1 millimeters. In certain embodiments, the microfibers have an average fiber diameter between 0.05-5, 0.1-2.5, 0.1-2, 0.1-1, or 0.1-0.5 microns. In some embodiments, the microfibers are characterized by the presence of silicon oxide, and optionally at least one other compound selected from aluminum oxide, boron oxide, sodium oxide, potassium oxide, calcium oxide, magnesium oxide, barium oxide, and zinc oxide. In some instances, the above compounds are present in the glass microfibers in amounts according to the following table:

| Compound | Nominal Wt., % |
| --- | --- |
| $SiO_2$ | 50-75 |
| $Al_2O_3$ | 0-5 |
| $B_2O_3$ | 0-15 |
| $Na_2O$ | 0-15 |
| $K_2O$ | 0-10 |
| CaO | 0-10 |
| MgO | 0-10 |
| BaO | 0-10 |
| ZnO | 0-10 |

In one embodiment, the glass microfiber has the following composition:

| Compound | Nominal Wt., % |
| --- | --- |
| $SiO_2$ | 55-65 |
| $Al_2O_3$ | 1-3 |
| $B_2O_3$ | 10-13 |
| $Na_2O$ | 8-12 |
| $K_2O$ | 3-5 |
| CaO | 1-3 |
| MgO | 0.5-3 |
| BaO | 3-7 |
| ZnO | 3-5 |

For embodiments involving battery separators, the soluble content (soluble or partially soluble) may be selected such that it, upon dissolution, enhances the performance of the battery. By way of example, incorporation of a zinc compound into the soluble content may decrease water loss in the battery, such as a SLA, VRLA, AGM, or VRLA AGM battery. As another example, a gel additive (such as certain fumed silica) in the soluble content may help to form gel electrolyte in the pores or openings of the mat, layer, AGM, or AGM separator.

The soluble content may be a naturally occurring biopolymer or a modified biopolymer, including a biopolymer selected from celluloses, gelatins, alginates, pectins, and mixtures thereof. The soluble content may be a synthetic polymer, including a synthetic polymer selected from polyvinyl alcohols, poly(meth)acrylic acids, polyethylene glycols, polyvinyl pyrrolidones, and mixtures thereof. The soluble content or material may be salt or mineral, such as talc, chalk, sodium chloride, zinc sulfate, or a combination thereof.

In certain embodiments, the soluble content may be bio-soluble, water-soluble at neutral pH, or only soluble at more acidic or alkaline pH levels (acidic pH levels may be preferred for batteries, in particular lead acid batteries). Alternatively, the soluble content may be water soluble across a range of pH levels, and, in yet another embodiment, the soluble content may be insoluble in water, but soluble in one or more organic solvents. Possibly preferred soluble contents or materials may be recycled or renewable materials or components. Other possibly preferred soluble contents or materials may be water soluble across a range of pH levels, and, in yet another embodiment, may be insoluble in water, but soluble in electrolyte, in acidic solutions, and/or in one or more organic solvents. The solubility in organic solvents may make this material suitable for lithium ion batteries.

In certain embodiments, the soluble content is only soluble at pH levels less than 7, less than 6, less than 5, less than 4, less than 3, less than 2, or less than 1. In other embodiments, the soluble content is soluble in strong acids such as sulfuric acid or other mineral acids, but not soluble or low solubility in weaker organic acids such as acetic acid.

The soluble content may be present in the separator, mat, layer, surface, component, AGM, AGM separator, paper, or the like, in an amount from 0.1-100% (for mats, layers, components, or surfaces), 0.1-20%, 0.1-10%, 0.1-5%, 0.1-4%, 0.1-3%, 0.1-2%, 0.5-2%, 0.1-1%, 0.25-1%, 0.5-1%, 0.5-1.5%, 0.5-2.0% or 1-2.5% by weight of the mat, layer, surface, component, AGM, AGM separator, or the like.

The inventive absorbent glass mat may be characterized, in some embodiments, by the presence of less than 10%, less than 7.5%, less than 5%, less than 2.5%, less than 1% or less than 0.1% by weight non-glass materials such as organic polymers. When the absorbent glass mat is intended for use as a battery separator, the separator may contain less than 10%, less than 7.5%, less than 5%, less than 2.5%, less than 1% or less than 0.1% by weight organic polymers. In some embodiments, the battery separator is composed substantially (e.g., 99% by weight or more, or 99.5% by weight or more) or solely of glass fibers.

The soluble content of the new or improved soluble content mat, layer, fibrous mat material (FMM), or AGM, new or improved soluble content pasting paper, new or improved soluble content PAM carrier or base, or of a new or improved soluble content separator may be any known insoluble and soluble fibers or materials that do not harm the battery, can be used in the mat, layer, FMM, AGM, pasting paper, or separator, and which preferably dissolve quickly in water, steam, acid, dilute acid, or electrolyte (solvent). In one embodiment, the soluble content may be particles, particulate, or fibrous material. The fibrous material may be nonwoven, mesh, woven, knit or combed material, or a combination thereof. The soluble content may be a blend of solvent dissolvable content and non-acid dissolvable content. The solvent dissolvable content may be any component that is dissolvable in the constituents of the battery's electrolyte (in the lead acid battery, this acid is typically a solution of sulfuric acid and water). In one embodiment, the dissolvable content may be water soluble content, acid soluble content, bio-soluble content, soluble glass content, soluble synthetic content, soluble suture material, cellulosic fiber, polyamide (e.g., nylon) content, content with soluble portions, co-polymers thereof, or mixtures or blends thereof. For example and without limitation, solvent soluble polymers may include polymers such as PVA, poly(acrylic acid), poly(acrylamide), poly(N—N-dimethylacrylamide), poly(N-vinyl imidazole), NIPAM, poly(ethylene glycol), poly(2- hydroxypropyl methacrylate), poly(2-ethyl-2oxazoline), poly(vinylamine), polypropylene, isotactic polypropylene, polymers that include 2-Acrylamido-2-methylpropane sulfonic acid (AMPS® Registered Trademark name of The Lubrizol Corporation), polymers that include a reactive, sulfonic acid or maleic acid monomer, Dextran, cellulose, cellulose hydroxyethyl ether, poly(ethylene oxide), Guar Gum, Chitosan, and/or the like. The non-dissolvable content or portion may be any content that is not dissolvable in the solvent contained within the battery. In one embodiment, the non-dissolvable content may be synthetic fibers, glass fibers, synthetic particles, or a blend thereof. The synthetic content may include polyolefins (e.g., polyethylene, polypropylene, polybutylene, etc.), polyesters (i.e., polyethylene terephthalate (PET), polybutylene terephthalate (PBT), etc.), acrylics, co-polymers thereof, and/or mixtures or blends thereof. As non-limiting examples of inventive mats, layers, AGMs, AGM separators, or the like, the weight ratio of the dissolvable content (fibers, particles, portions, materials, and/or the like) to the non-dissolvable content (fibers, particles, portions, materials, and/or the like) in one embodiment may be in the range of about 0.1-100:0-99.9; in another embodiment may be in the range of about 20-80:80:20; in yet another embodiment, the ratio may be about 30-70:30-70; in still yet another embodiment, the ratio may be about 40-60:40-60; and including all sub sets in the ranges set forth before. The basis weight of the nonwoven may be in the range of about 0.1-900 grams/square meter (gsm), in another embodiment, about 5-500 gsm in yet another embodiment, about 10-40 gsm, or in still yet another embodiment, about 100-500 gsm, and including all sub sets in the ranges set forth before. The weight percentage of the dissolvable content may be, for example, in the range of about 0.001-20%; 0.01-20%; or 0.1-30% The nonwoven may have a porosity greater than about $1001/m^2$, or about $12001/m^2$, or about $15001/m^2$. In one embodiment, the nonwoven may be the new or improved soluble content mat, AGM, layer, pasting paper, pasting paper backing, or separator. In another embodiment, the soluble content is added to a microporous PE membrane or separator (such as a PE, silica, and oil membrane). Such an inventive soluble content PE membrane or layer may be added to the AGM layer or layers. In possibly preferred embodiments, the soluble content (for example, soluble fiber content) may be in small amounts well dispersed to avoid large openings or large channels to prevent dendrites or shorting the plates, and possibly most preferred are 1%, 5%, 10%, 15%, or 20% soluble content (for example, soluble fiber, especially acid soluble microfibers).

The inventive soluble content absorbent glass mats, FMM, or AGM disclosed herein may be prepared by conventional glass mat, FMM, or AGM production techniques (such as being wet laid) or by non-aqueous techniques such as airlaid, drylaid, air entangled, electro-spun, knit, woven, compacted, filled, sprayed, coated, thermally bonded, infused, or the like depending on the desired dissolution solvent (water, steam, electrolyte, acid, or dilute acid).

In one embodiment, the novel or improved absorbent glass mats disclosed herein may be used to prepare a separator for a VRLA battery. The enhanced porosity of the separator may be created in-situ by exposing the compressed absorbent glass mat to an acid, such as during the fill process, whereby the soluble content is dissolved facilitating the absorption of the electrolyte by the separator.

Using the following definitions: "initial pore size" is the mat, AGM or separator pore size before compression and before dissolution of the soluble content, as prepared AGM with soluble fibers intact and not compressed; "compressed pore size" is the pore size after compression but before dissolution of the soluble content; and "post dissolution pore size" is the resultant pore size after compression and after dissolution of the soluble content, in accordance with certain embodiments, the initial pore size of an inventive mat or AGM may be around 1 um (or μm) to 100 um. Then after compression, the compressed pore size may go down to about 0.01 um to 2 um. Then after dissolution, the post dissolution pore size may go up to (may open up the compressed pores) to about 0.05 um to 5 um or more. In a particular possibly preferred embodiment, it may be preferred that the enhanced porosity separator prepared by this method typically will have a post dissolution final average pore size of less than 5 μm, more preferably less than 2 μm, and most preferably less than 1 μm in diameter. In some examples, more than 50% of the post dissolution pores are 0.5 μm or less in diameter, and possibly more preferably at least 90% of the post dissolution pores have a diameter of 0.5 μm or less. The possibly preferred separator may have an effective average post dissolution pore size within the range of 0.05 μm to 1.0 μm (e.g., 0.1 μm to 0.2 μm).

Another embodiment includes a valve-regulated lead-acid battery comprising at least two oppositely charged electrodes in a closed case, an electrolyte, and a separator between adjacent ones of said electrodes, wherein said separator has in-situ pores, spaces, channels, or openings obtained by exposing the soluble content mat, glass mat, layer, surface, AGM, or AGM separator to the electrolyte. The separator is in contact with said electrodes. In some embodiments, the electrolyte is totally absorbed by the separator and the electrodes or plates.

EXAMPLES

Possible non-limiting examples include:
1. Up to 20% soluble content AGM
2. Up to 10% soluble content AGM
3. Up to 5% soluble content AGM
4. Soluble fiber+soluble particles AGM
5. Compressed AGM separator goes from 80% or less porosity to 85% or more porosity upon the addition of acid
6. Compressed AGM separator goes from 90% or less porosity to 95% or more porosity upon the addition of acid
7. Positive plate/Thin soluble layer/AGM
8. Negative plate/thin soluble layer/AGM
9. Positive plate/Thin soluble layer/soluble content AGM
10. Negative plate/thin soluble layer/soluble content AGM
11. Thin soluble layer/AGM/Thin soluble layer
12. Pasting paper with soluble layer
13. Soluble content AGM/soluble content pasting paper
14. Soluble layer AGM/soluble content pasting paper
15. Soluble content AGM/soluble layer pasting paper
16. Soluble layer AGM/soluble layer pasting paper
17. Soluble content AGM/soluble content PE
18. Soluble content pasting paper/soluble content AGM/soluble content PE
19. Soluble layer pasting paper/soluble layer AGM/soluble content PE
20. Soluble layer pasting paper/AGM/soluble content PE
21. Soluble layer pasting paper/soluble layer AGM/PE
22. Pasting paper/soluble layer or content AGM/soluble content PE
23. Pasting paper/AGM/soluble content PE
24. C-wrap or fold soluble layer or content AGM
25. C-wrap or fold soluble layer or content AGM/PE 26. C-wrap or fold soluble layer or content AGM/PE/AGM
27. C-wrap or fold AGM/soluble content PE/AGM
28. Z fold or serpentine soluble layer or content AGM
29. Z fold or serpentine soluble layer or content AGM/PE
30. Z fold or serpentine soluble layer or content AGM/soluble content PE
31. Z fold or serpentine soluble content mat/soluble content PE
32. Envelopes, pockets, sleeves, wraps, leaves, and/or pieces of the above mats, layers or separators At least one aspect of this disclosure is to use acid soluble glass fibers in AGM. These soluble fibers may be used in building insulations for safety. When these fibers get in contact with body fluid (which is acidic), the fibers dissolve. For example, if fibers are inhaled (or get into the body through other means), they will not clog lung exchange pathways because they dissolve in body fluid. Similarly if this soluble fiber is used in AGM in selected quantities, they can create open pathways in separator regions to enable better wicking of sulfuric acid and bringing it in close proximity of the electrodes. AGM due to its compressed state (during assembly) will have limited pores to soak or wet sulfuric acid. Creation of in-situ pores through dissolution will address or circumvent this problem of slow acid filling.

As it takes around 30 minutes to acid fill conventional AGM batteries (limited space available for acid to move downward), part of the battery electrodes get sulfated and reduce the capacity of conventional batteries. Any method to speed up the acid filling process will contribute to improved productivity and improved initial capacity. Existing method is to apply vacuum to fill acid in AGM batteries.

The present inventive use of materials that dissolve in acid to create open space during the acid filling process with or without vacuum is an improvement in AGM batteries. This can be accomplished by introducing sulfuric acid soluble components in new, improved or optimized AGM separators. During acid filling process, the soluble components dissolve quickly in acid and create open space in inventive AGM that will wick acid quickly upward (in bottom-up fill process) enabling faster filling process.

In accordance with at least selected embodiments, aspects or objects, there may be provided novel or improved absorbent glass mats, separators, cells, batteries, battery strings, and/or methods of manufacture, use, acid filing, and/or the like, novel or improved absorbent glass mat (AGM) separators with enhanced porosity and/or wettability, AGM separators, valve regulated lead acid (VRLA) AGM batteries, and/or related methods of manufacture, use, acid filing, and/or the like, novel or improved absorbent glass mats and/or absorbent glass mat (AGM) separators combined with novel or improved soluble content pasting papers and/or novel or improved soluble content polyethylene (PE) separators, and/or the like.

U.S. Pat. Nos. 6,194,100; 6,689,509; 6,703,161; 6,852,444; 6,869,726; and 7,682,738 are incorporated by reference herein.

Disclosed herein are soluble content absorbent glass mats for AGM separators. Such glass mats may be prepared from insoluble glass fibers blended with soluble content materials. Upon exposure to a suitable solvent, the dissolving or solvating of the soluble content produces voids or empty space within the glass fibers mat. The empty space can be one dimensional or two dimensional or three dimensional due to soluble content in the form of particles, flakes, layers or fibers. The voids enhance the absorption of the solvent within the glass fiber mats. The soluble content may be acid-soluble glass fibers not heretofore used in AGM separators for VRLA AGM batteries.

In accordance with selected embodiments, the possibly preferred diameter and/or length of the soluble fiber are as follows:

The fiber should be a microfiber with a diameter of the order 0.1 um (micron)-3 um with probably 5 um being the maximum to achieve optimum properties. If it is bigger than 5 um, then it will create channels that may short quickly. It should be small enough to provide the best capillary action (smaller the diameter, higher is the wicking as per capillary forces) and small enough to prevent shorting once the channel is opened up.

When the fibers are so thin they bend like hair and therefore the channels will go all through thickness or upward or downward (as fiber orientation will be random)—this is good as this may create homogeneous distribution of acid across and through the mat or AGM.

Soluble fibers, layers, flakes, or particulates provide 3, 2 and 1 dimensional space creation in the improved AGM.

The preferred fibrous material is glass. Generally all glass fiber materials known in the art for producing glass mats or absorptive glass mat (AGM) separators may be used for forming the non-soluble fibrous layers of the present invention. A preferred fibrous material are absorptive microfiber glass fleeces without organic components like binder or polymeric fibers. It is preferred that the fibers have a diameter ranging from 0.1 to 10 μm, more preferably from 0.1 to 5 μm or less. The fibers are preferably blends of acid resistant glass fibers of various diameter, usually extremely thin fibers with an average fiber diameter below 1 referred to as microfibers, and "coarse" fibers with an average diameter of approximately 3 μm. The microfibers increase the internal surface, improve the tensile strength and decrease the pore diameter but significantly increase the product cost. The larger fibers facilitate the battery filling by creating larger pores with faster acid pick-up, often referred to as wicking rate. The inventive soluble fibers may be soluble versions of the various diameter glass fibers with microfibers being most preferred.

In accordance with certain embodiments, aspects or objects, there is provided:

An absorptive glass mat or separator comprising:
  a) acid insoluble fibers, and
  b) at least one acid soluble material.

The absorptive glass mat above, wherein the soluble material is a glass microfiber that comprises silicon oxide, and at least other compound selected from aluminum oxide, boron oxide, sodium oxide, potassium oxide, calcium oxide, magnesium oxide, barium oxide, zinc oxide, and mixtures thereof.

The absorptive glass mat above, wherein the glass microfiber comprises silicon oxide, aluminum oxide, boron oxide, sodium oxide, potassium oxide, calcium oxide, magnesium oxide, barium oxide, and zinc oxide.

The absorptive glass mat precursor according to the above, wherein the acid soluble glass microfiber is present in an amount from 0.1-10%, 0.1-5%, 0.1-4%, 0.1-3%, 0.1-2%, 0.5-2%, 0.1-1%, 0.25-1%, 0.5-1%, 0.5-1.5%, 0.5-2.0% or 1-2.5% by weight of the absorptive glass mat.

The absorptive glass mat according to the above, wherein the acid soluble glass microfiber has an average fiber diameter of 0.05-5, 0.1-2.5, 0.1-2, 0.1-1, 0.1-0.5, 0.2-0.4, 0.4-0.6, 0.5-0.7, 2.5-3.0, or 3.5-4.5 microns.

The absorptive glass mat according to the above, wherein the acid soluble glass microfiber has an average fiber length less than 1.5, less than 1.25, less than 1.0, less than 0.75, less than 0.5, less than 0.25 or less than 0.1 millimeters or 0.05-5, 0.1-2.5, 0.1-2, 0.1-1, or 0.1-0.5 microns.

A method of making a battery, comprising the step of combining a compressed absorptive glass mat with an electrolyte, wherein the absorptive glass mat comprises:
a) electrolyte insoluble fibers, and
b) at least one electrolyte soluble content.

The method above, wherein the electrolyte soluble content comprises one or more acid-soluble glass microfibers, polymers, salts, or the like.

A valve-regulated lead-acid battery comprising:
a) at least two oppositely charged electrodes in a closed case,
b) an electrolyte comprising a dissolved soluble content, and
c) a separator between adjacent ones of said electrodes, wherein the dissolved soluble content comprises glass microfibers.

Novel or improved absorbent glass mats, separators, batteries, and/or methods of manufacture, use, acid filing, and/or the like, novel or improved absorbent glass mat (AGM) soluble content separators with enhanced porosity and/or wettability, AGM separators, valve regulated lead acid (VRLA) AGM batteries, and/or related methods of manufacture, use, acid filing, and/or the like, novel or improved soluble content absorbent glass mats and/or absorbent glass mat (AGM) separators combined with novel or improved soluble content pasting papers and/or novel or improved soluble content polyethylene (PE) separators, and/or the like as shown or described herein.

Disclosed herein are soluble content absorbent glass mats for AGM separators. Such glass mats may be prepared from insoluble glass fibers blended with soluble content materials. Upon exposure to a suitable solvent, the dissolving or solvating of the soluble content produces voids within the glass fibers. The voids enhance the absorption of the solvent within the glass fibers. The soluble content may be acid-soluble glass fibers not heretofore used in AGM separators for VRLA AGM batteries.

In accordance with at least selected embodiments, aspects or objects, of the disclosure, solution or invention, there are provided novel or improved absorbent glass mats, separators, batteries, cells, systems, and/or vehicles, and/or methods of manufacture, use, and/or acid filing, and/or combinations thereof; novel or improved absorbent glass mat (AGM) soluble content separators with enhanced porosity and/or wettability, AGM separators, and/or valve regulated lead acid (VRLA) AGM batteries, and/or related methods of manufacture, use, and/or acid filing, and/or combinations thereof; novel, improved or optimized soluble content absorbent glass mats and/or absorbent glass mat (AGM) separators combined with novel, improved or optimized soluble content pasting papers and/or novel, improved or optimized soluble content polyethylene (PE) separators, and/or novel, improved or optimized batteries, cells, systems, and/or vehicles containing such soluble content absorbent glass mats, absorbent glass mat (AGM) separators, soluble content pasting papers, soluble content polyethylene (PE) separators, and/or combinations thereof; the soluble content may be fibers, flakes, pieces, portions, particles, and/or the like; improved absorbent glass mats, improved VRLA batteries, better acid fill rates, and/or means to minimize the acid fill time (to increase the fill rate) to produce lower cost, higher capacity and/or longer cycle life VRLA AGM batteries; and/or combinations thereof.

Disclosed herein are soluble content glass mats, FMM, AGM, absorbent glass mats, or AGM separators for VRLA, AGM, or VRLA AGM batteries. Such glass mats may be prepared from insoluble glass fibers blended with soluble content materials. Upon exposure to a suitable solvent, the dissolving or solvating of the soluble content produces voids within the glass mat. The voids enhance the absorption of the solvent within the glass mat. The soluble content may be acid-soluble glass fibers or microfibers.

As used in the specification and the appended claims, the singular forms "a," "an" and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other additives, components, integers or steps. "Exemplary" means "an example of" and is not intended to convey an indication of a preferred or ideal embodiment. "Such as" is not used in a restrictive sense, but for explanatory purposes.

The foregoing written description, including figures, of structures and methods has been presented for purposes of illustration. Examples are used to disclose the invention, including the best mode, and also to enable any person skilled in the art to practice the invention, including making and using any devices or systems and performing any incorporated methods. These examples are not intended to be exhaustive or to limit the invention to the precise steps and/or forms disclosed, and many modifications and variations are possible in light of the above teaching. Features described herein may be combined in any combination. Steps of a method described herein may be performed in any sequence that is physically possible. The patentable scope of the invention is defined by the appended claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A separator for a battery comprising:
at least one acid insoluble fibrous component, and
at least one acid soluble fibrous component, wherein said at least one acid soluble fibrous component comprises one of the group consisting of at least one metal oxide, at least one metalloid oxide, and any combination thereof; and
further comprising a pasting paper, a PE membrane, or a separator precursor.

2. The separator of claim 1 wherein said at least one metalloid oxide comprises one or more of the group consisting of silicon oxide, boron oxide and any combination thereof.

3. The separator of claim 1 wherein said at least one metal oxide comprises one or more of the group consisting of one or more alkali metals, one or more alkaline earth metals, one or more transition metals, one or more post-transition metals, and any combination thereof.

4. The separator of claim 1 wherein said at least one metal oxide comprises one or more of the group consisting of aluminum oxide, barium oxide, calcium oxide, magnesium oxide, potassium oxide, sodium oxide, zinc oxide, and any combination thereof.

5. The separator of claim 1 wherein said at least one acid soluble fibrous component is present in an amount from approximately 0.1% to approximately 20% by weight of said separator.

6. The separator of claim 5 wherein said at least one acid soluble fibrous component comprises equal to or less than approximately 4% by weight of the separator.

7. The separator of claim 1 wherein said at least one acid insoluble fibrous component is present in an amount from approximately 80% to approximately 99.9% by weight of said separator.

8. The separator of claim 7 wherein said at least one acid insoluble fibrous component comprises at least greater than approximately 96% by weight of the separator.

9. The separator of claim 1 wherein said at least one acid soluble fibrous component has an average fiber diameter of approximately 0.02 µm to approximately 10 µm.

10. The separator of claim 1 wherein said at least one acid soluble fibrous component comprises or further comprises one of the group consisting of a fiber, a glass, a polymer, a salt, a layer, a flake, a particle, a piece, a portion, and any combination thereof.

11. The separator of claim 1 wherein said at least one acid soluble fibrous component further comprising at least one other compound selected from aluminum oxide, boron oxide, sodium oxide, potassium oxide, calcium oxide, magnesium oxide, barium oxide, zinc oxide, and any combination thereof.

12. The separator of claim 1 wherein said at least one acid soluble fibrous component has an average fiber length less than 2 µm.

13. The separator of claim 1 further comprising a plurality of layers of said at least one acid insoluble fibrous component and said at least one acid soluble fibrous component.

14. A method of making a battery comprising the steps of:
providing an anode and a cathode;
positioning at least a portion of said separator of claim 1 between said anode and said cathode; and
disposing said anode, said cathode, and said separator within an acidic electrolyte.

15. The method of claim 14 further comprising:
folding said separator in a C-shape so as to at least partially wrap one or both of said anode or said cathode.

16. A lead acid battery comprising:
an anode and a cathode adjacent to one another;
at least one of said separator of claim 1 at least partially disposed between said anode and said cathode; and
an acidic electrolyte.

17. The lead acid battery of claim 16 wherein said at least one of said separator of claim 1 is folded in a C-shape and at least partially wraps one or both of said anode or said cathode.

18. The separator of claim 1 wherein said at least one acid insoluble fibrous component is at least two acid insoluble fibrous components.

19. The separator of claim 1 wherein said at least one acid soluble fibrous component is at least two acid soluble fibrous components.

20. In a lead acid battery, the improvement comprising the separator of claim 1.

21. In a VRLA battery, the improvement comprising the separator of claim 1.

22. A pasting paper for a lead acid battery comprising:
at least one acid insoluble fibrous component, and
at least one acid soluble fibrous component, wherein said at least one acid soluble fibrous component comprises one of the group consisting of at least one metal oxide, at least one metalloid oxide, and combinations thereof.

* * * * *